United States Patent
Hyziak et al.

(10) Patent No.: US 6,947,180 B1
(45) Date of Patent: Sep. 20, 2005

(54) METHOD FOR REDUCING ANALOG FACSIMILE CALL DURATION OVER CDMA

(75) Inventors: Janusz Hyziak, Des Plaines, IL (US); Saurabh Rastogi, Patpar Ganj (IN); Scott Finkle, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 898 days.

(21) Appl. No.: 09/660,112

(22) Filed: Sep. 12, 2000

(51) Int. Cl.[7] ............................ H04N 1/00; H04M 11/00
(52) U.S. Cl. ................ 358/400; 379/100.01; 358/405
(58) Field of Search ................ 379/100.01, 100.06, 379/100.09, 102.01, 102.02; 358/400, 405, 358/426.08, 426.09, 426.15, 426.16, 435; 455/555, 553, 557

(56) References Cited

U.S. PATENT DOCUMENTS

| | | | | |
|---|---|---|---|---|
| 5,212,808 A | * | 5/1993 | Su et al. | 455/502 |
| 5,491,565 A | * | 2/1996 | Naper | 358/468 |
| 5,926,500 A | * | 7/1999 | Odenwalder | 375/144 |
| 6,055,441 A | * | 4/2000 | Wieand et al. | 455/557 |
| 6,057,943 A | * | 5/2000 | Kweon et al. | 358/435 |
| 6,459,907 B1 | * | 10/2002 | Feli | 455/557 |
| 6,571,109 B1 | * | 5/2003 | Kim | 455/555 |
| 2001/0015968 A1 | * | 8/2001 | Sicher et al. | 370/352 |
| 2002/0013854 A1 | * | 1/2002 | Eggleston et al. | 709/234 |

FOREIGN PATENT DOCUMENTS

| | | | | |
|---|---|---|---|---|
| EP | 1381170 | * | 1/2004 | H04B 7/005 |
| JP | 411055218 A | * | 2/1999 | H04J 13/02 |

OTHER PUBLICATIONS

Fax; 1992; McConnel, Bodson and Schaporst; pp. 136 and 137.*

* cited by examiner

Primary Examiner—Jerome Grant, II
(74) Attorney, Agent, or Firm—Steven A. May

(57) ABSTRACT

Analog facsimile transmission message time can be significantly reduced over a CDMA network by preemptively sending a preamble message indicator (PMI) without waiting for the accumulation of entire preamble or messages that follow ITU T.30 preamble messages.

12 Claims, 3 Drawing Sheets

METHOD FOR REDUCING ANALOG FACSIMILE CALL DURATION OVER CDMA

FIELD OF THE INVENTION

This invention relates to wireless communication systems. In particular, this invention relates to a method for reducing the time required to complete an analog facsimile transmission over a CDMA cellular telephone system.

BACKGROUND OF THE INVENTION

Cellular telephone systems are well known. In many parts of the world, including the United States, cellular systems now provide two-way telecommunications capability that is regularly provided elsewhere by land-line telephone systems. In addition to voice communications, cellular telephone systems also carry facsimile message traffic.

In a fax transmission, a page of a document is optically scanned to produce electronic signals representative of the page's image. The signals are transferred across a switching network to another fax machine whereat the electronic signals from the first fax machine are processed to reproduce a near-perfect likeness of the document page that was optically scanned by the fax machine at the sending end.

Fax transmission in the U.S. and elsewhere comply with the International Telecommunications Union (ITU) standard no. ITU-T.30. ITU standards are readily available from the ITU web site at www.itu.org.

A problem with sending a fax transmission via a CDMA wireless network is that most fax transmissions are indeed analog signals comprised of tones that represent the images on a page being copied and transmitted. Stated alternatively, fax transmissions on a wireline communications system comply with T.30; fax transmissions on a wireless CDMA system comply with a different standard known as the I707 standard for CDMA cellular systems, which is a digital system. Accordingly, when transmitting a fax over CDMA, the analog ITU-T.30 fax protocol must be converted during the transmission process to a digital standard or protocol by which the analog fax signals can be carried over a digital cellular transport. Transmitting an analog fax over a CDMA cellular system also requires that certain control messages sent between the fax machines be completely assembled at the CDMA gateways, thereby increasing the time required to complete a fax transmission.

A method of reducing an analog fax transmission over a CDMA cellular system would be an improvement over the prior art.

SUMMARY OF THE INVENTION

There is provided a method for reducing the time required to transmit an analog fax over a CDMA cellular system. Analog facsimile protocols are well defined in the International Telecommunications Union Standard T.30. This standard prescribes how an analog fax machine is to communicate with another ITU-T.30-compliant fax machine via standard telephone lines. The T.30 standard requires the transmission of a preamble message prior to the transmission of certain fax control signals.

Improved synchronization and reduced transmission time is achieved by detecting the beginning of an ITU-T.30 preamble message at the entry point of a CDMA cellular system. Instead of waiting for the complete reception of a preamble message and the subsequent control messages, upon the detection of an ITU T.30 preamble, the CDMA terminal equipment generates a new, preamble message indicator or "PMI" that can be sent across the CDMA network on a high-speed data link and which indicates to the cellular network that a T.30 preamble message has been detected by the CDMA system. Upon detecting the PMI at the exit point of the CDMA cellular system, the CDMA infrastructure equipment (and without waiting for subsequent control messages following the preamble to be received) re-generates a new T.30 preamble that is sent to the analog fax machine coupled to a CDMA cellular system, for a mobile-to-land call. End-to-end transmission time is reduced by eliminating the need to completely receive a T.30 preamble message and subsequent control messages before starting the preamble at the message destination.

DETAILED DESCRIPTION OF THE PREFERRED EMBODIMENT

Figure 1:
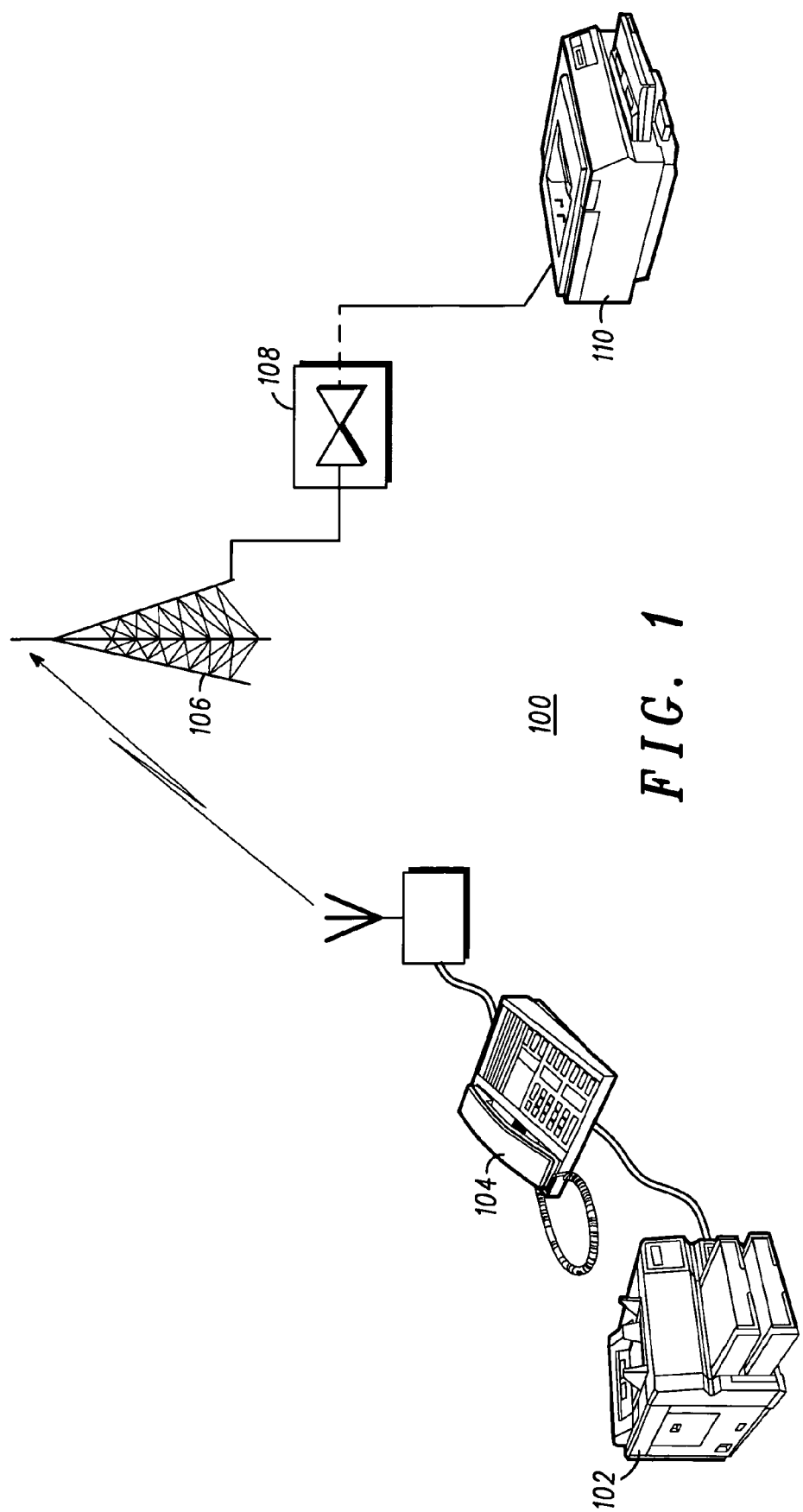
FIG. 1 is a simplified block diagram of a portion of a cellular communication network by which an analog facsimile transmission is enabled over a CDMA cellular network.

An advantage of the invention over the prior art is reduced facsimile transmission time. In order to appreciate message sequence time, the network over which a facsimile transmission is carried is shown in FIG. 1, which is a simplified block diagram of a communication system 100 by which an analog facsimile transmission is carried over a wireless CDMA communications system.

An ITU-T.30-compliant analog fax machine 102 is coupled to a wireless CDMA telephone set 104, which is frequently referred to as a fixed wireless terminal. The CDMA fixed wireless terminal 104 communicates with a CDMA cellular telephone network infrastructure using CDMA (insert) modulation, which is not germane to an understanding of the invention and therefore not shown but otherwise known to those skilled in the art. The infrastructure 106 detects and decodes the CDMA modulation and routes the call through a switching system or through other infrastructure equipment 108 to another ITU-T.30-compliant analog fax machine 110 (the receiving fax machine).

Figure 2:
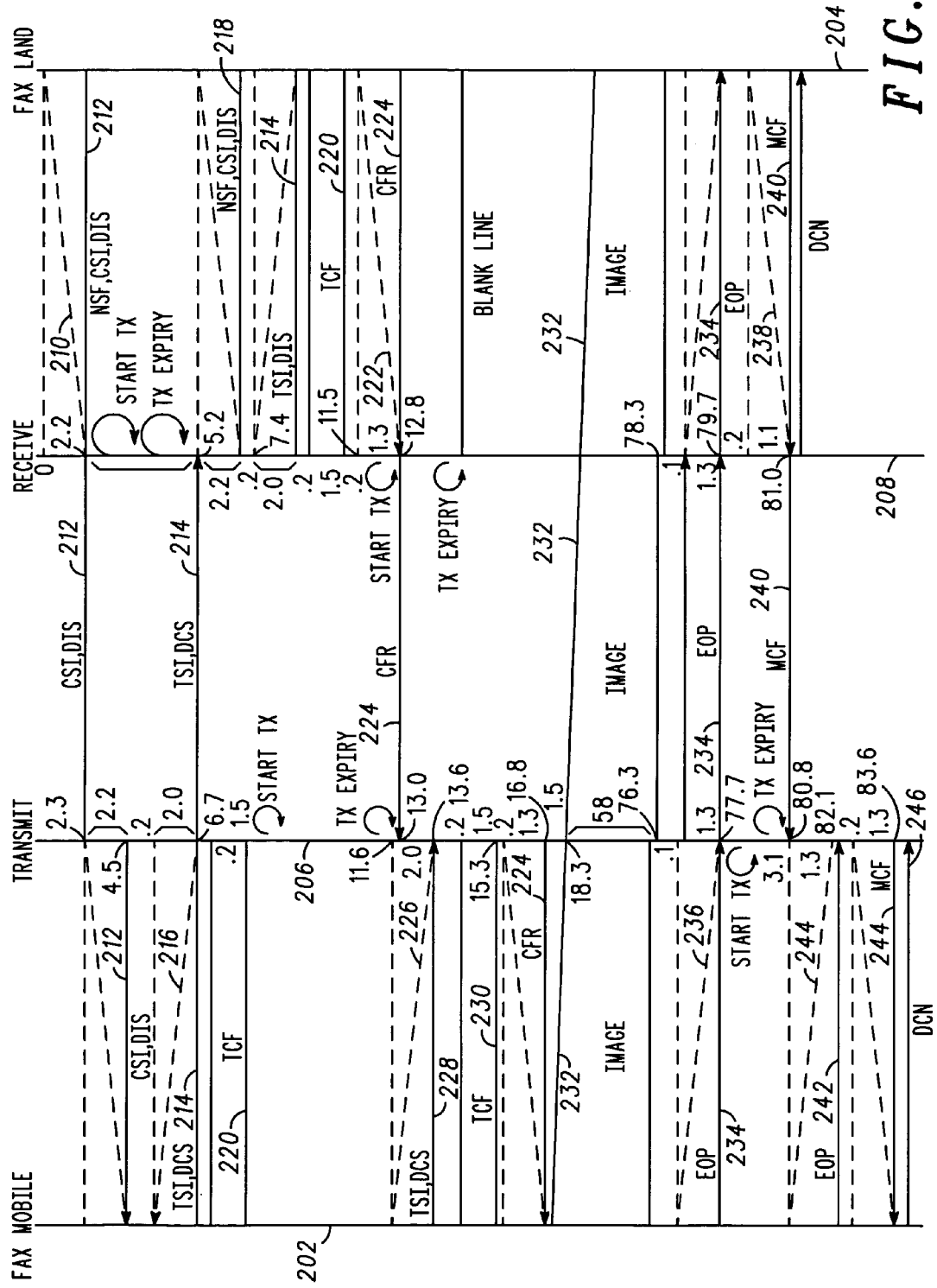
FIG. 2 shows a simplified flow diagram of the prior art message sequence timing of an ITU T.30-compliant fax transmission over a CDMA network.

FIG. 2 shows a flow diagram 200 of the messages exchanged in an ITU-T. 30-compliant fax transmission over a CDMA network using prior art techniques.

In FIG. 2, the vertical line 202 on the left side of the drawing (and which is labeled "MOBILE") identifies the logical boundary of the combination of an analog fax machine and CDMA fixed wireless terminal 102, 104 depicted in FIG. 1. Depending upon the orientation of the lines and arrowheads, the solid and broken lines intersecting the vertical "MOBILE" line 202 represent signals that are sent to or from the combination of the wireless terminal/ analog fax machine from which a document is to be sent (i.e. the sending fax) to another analog fax machine 110 that is referred to herein as the receiving or land-line fax, represented by the vertical line 204 on the extreme right-hand side of FIG. 2 drawing under heading "LAND LINE FAX."

Between these two fax machine lines 202, 204 are two vertical lines labeled "TX" 206 and "RX" 208 which represent the entry and exit points (or boundaries) of the CDMA wireless system. The "TX" line 206 denotes the entry point of the CDMA system for the sending fax machine. Signals to and from the sending fax machine, as represented by the various inclined line segments, are with respect to the TX end of the CDMA system. The "RX" line 208 denotes the entry point of the CDMA system for the receiving fax machine 110. Signals to and from the receiving fax 110 are with respect to the RX end of the CDMA system.

Signal timing is shown by way of the intersection of the inclined line segments with the vertically-oriented lines demarked as TX, RX, etc.

As shown in the flow diagram of FIG. 2, (which is an exemplary message sequence of a single ITU-T.30 mobile-to-land fax call and therefore not necessarily representative of the timing of all such calls, the timing of which will vary according to image content, fax machine specifications by manufacturer and RF conditions) several different messages are exchanged before an image is actually transmitted. The signaling that is exchanged between two fax machines is specified in the ITU T.30 standard.

At time $T_0$, the receiving fax machine (identified in FIG. 1 by reference numeral 110) has just answered an incoming call (placed by the sending end fax machine that is identified by reference numeral 102 in FIG. 1). 2.2 seconds later, the receiving fax completes sending a T.30-compliant preamble 210 followed by the T.30 NSF, CSI and DIS messages 212 to the CDMA infrastructure RX boundary. These messages are always preceded by a preamble message 210, which is typically several bytes in length.

(The "CSI" message is the Called Subscriber Id, that is sent by the answering fax machine to identify itself. The "DIS" message is the Digital Id Signal, and is sent by answering fax machine specifying its capabilities, including communication speeds, paper size, and resolution. "NSF" refers to the Non-Standard Facilities message that is sent by answering device, conveying any proprietary information for two compatible devices to improve transmission.)

After the CDMA RX infrastructure equipment (at line 208) receives the NSF, CSI and DIS messages 212 from the receiving fax 110, the messages are sent across the CDMA system to the TX end of the link (at line 206) which requires about 0.1 seconds of time. Accordingly, 2.3 seconds after the RX end (at line 208) of the CDMA network detected that the receiving machine answered the call, the TX end (at line 206) of the CDMA infrastructure has received the CSI and DIS messages 212, (the NSF message is dropped at the RX terminal equipment at line 208) which are then passed along to the sending fax machine 102.

2.2 seconds after the TX end (at line 206) of the CDMA network sends the CSI and DIS messages 212, the sending fax 102 sends its own TSI and DCS messages 214, to the TX end (at line 206) of the CDMA network following a message preamble 216. (The "TSI" message is the Transmitting Subscriber Id data sent by originating fax. DCS or Digital Command Signal, also sent by originating fax machine, conveys any parameters that were up to that point negotiated by the two machines.)

TSI and DCS messages 214 from the sending fax 102 at the RX end (at line 208) traverse the CDMA network asynchronously with respect to the RX time, but are nevertheless expected by the receiving fax 110. During the 5.2 seconds after the receiving fax machine 110 first answered, it expected a response to its first transmission of its NSF, CSI and DIS messages 212. The unanswered transmission of NSF, CSI and DIS messages 212 precipitates a retransmission of these messages 218 by the receiving fax machine.

An inspection of the messages received at the RX end (at line 208) of the CDMA system approximately 6.8 seconds into the call reveals that while the RX end is receiving the TSI and DCS messages 214, the receiving fax 110 is trying to re-send new NSF, CSI and DIS messages 218, resulting in a message collision at the RX end (at line 208) of the CDMA network. Approximately 0.5 seconds after the TSI and DCS messages 214 were first received at the RX end (at line 208), the TSI and DCS messages 214 are forwarded to the receiving fax 110 by the CDMA infrastructure.

As the TSI and DCS messages 214 are making their way across the CDMA network to the receiving fax machine 110, the sending fax machine 102 begins to send a synchronization training messages "TCF" 220. At the RX end (at line 208) TCF 220 is sent to the landline fax, thereby causing the receiving fax 110 to send a preamble 222 followed by the CFR signal 224 (confirmation to send—sent by receiving fax machine to indicate that the training TCF sequence was received properly) approximately 11.5 seconds after the call was first answered.

Approximately 0.2 seconds after the CFR 224 is sent from the RX end (at line 206), it is received at the TX end (at line 208), 224 and sent to the sending fax 102, 224. Because the sending fax 102 expected a response to its first transmission of TSI, DCS and TCF 214 and 220 but a response was not received, the sending fax re-sends the TSI and DCS messages 228, following a preamble 226, which is in turn followed by another TCF message 230, all while the CFR signal 224 is crossing the CDMA network boundary at line 206.

After resolving the signal collisions within the CDMA TX-side equipment, approximately 16.8 seconds into the call, the CFR 224 has been sent to the sending fax machine from the TX end of the CDMA network (at line 206 to line 202). 1.5 seconds later, image data 232 from the sending fax machine 102 (at line 202) is received at the TX terminal (at line 206) of the CDMA network whereupon image data 232 is sent across the CDMA network, lasting about 58 seconds for the example shown in FIG. 2. (Transmission time of an image is highly variable, depending upon image content.)

77.7 seconds into the call, the TX end of the CDMA network receives an EOP 234 (end of procedure, indicating data transmission has concluded) following another preamble 236. Approximately 2.0 seconds later the RX end (at line 208) of the CDMA network receives the EOP 234 at line 208 and forwards the EOP 234 to the receiving fax 110 at line 204. 1.3 second later, i.e. 81 seconds into the call, RX receives a MCF (message confirmation) 240 following a preamble 238. The MCF 240 is sent through the CDMA network to the TX end (at line 206). Because the MCF 240 was not promptly received, the sending fax 102 re-sends the EOP message 242 following a preamble 244, which collides with the MCF message 240 at the TX end (at line 206) of the CDMA network. Approximately 83.6 seconds into the call, the TX end of the CDMA system has sorted out the message collisions and forwarded to the sending fax 102, the MCF message 244, which is then followed by the DCN message 246, closing the link between the two fax machines.

Those skilled in the art will recognize that the various ITU T.30 control messages exchanged between the fax machines are, with few exceptions, preceded by preamble message blocks. In the prior art, the message preamble and the message data must be received and decoded before further transmission takes place. A significant transmission time savings can be realized if the CDMA infrastructure is capable of recognizing a T.30 message preamble and immediately sending instead, a preamble message indicator or "PMI" over a high-speed data link. Stated alternatively, when an ITU T.30 preamble message from either fax machine is detected at the CDMA system boundaries, the CDMA system sends a preamble message indicator via a high speed data link, without waiting for the complete preamble or the message content to be received. In the invention, a T.30 message preamble is recognized by the well-known format of a T.30 preamble. In the preferred embodiment, recognizing as few as four or five bytes out of a 36–40 byte preamble can form the basis of a decision that an incoming message is a preamble. In the preferred embodiment, the number of bytes that are tested for conformance to the T.30 preamble format is variable so that depending upon channel noise or other signal characteristics, a decision of whether a stream of bytes is a preamble can be adjusted appropriately.

Figure 3:
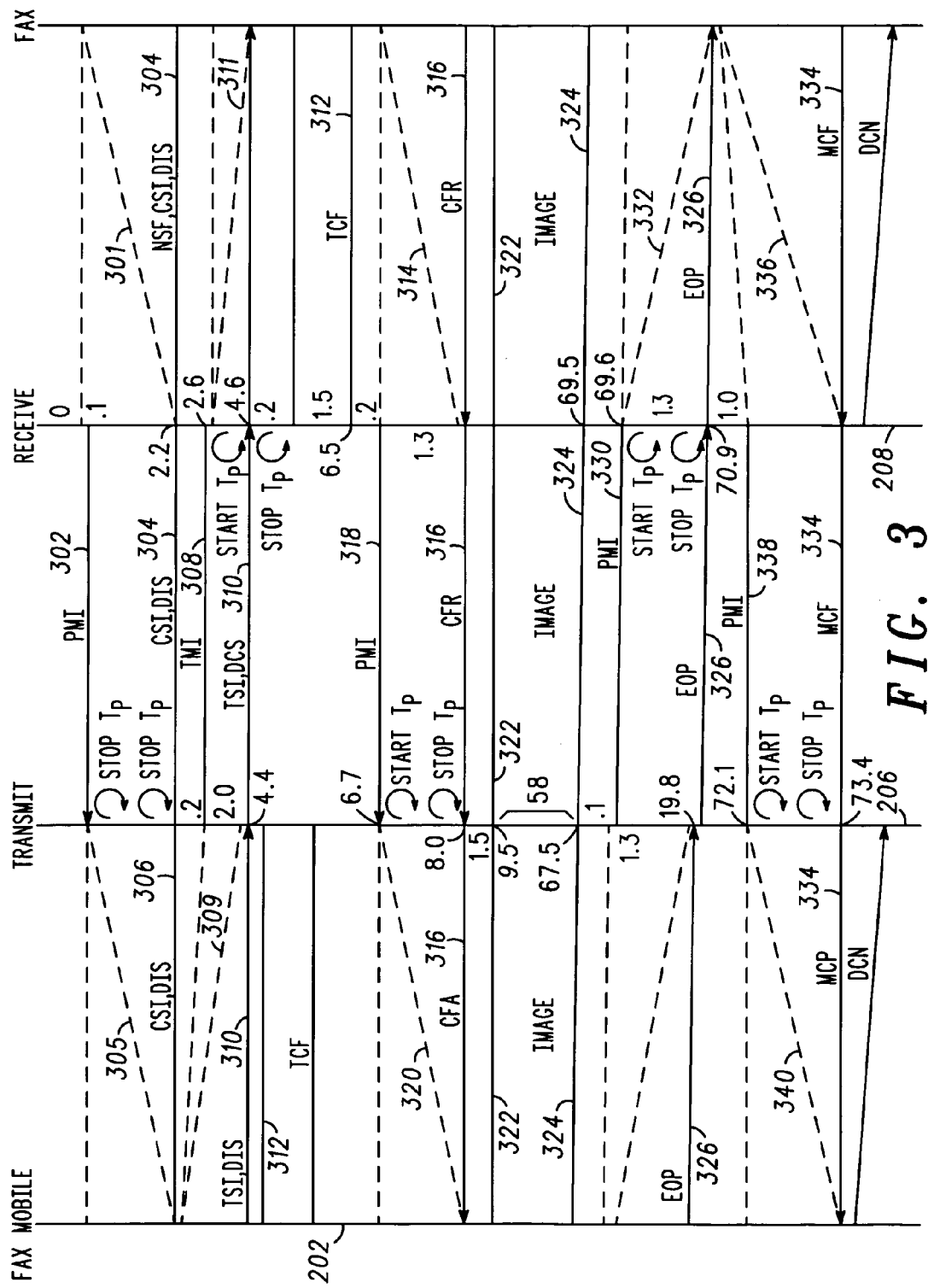
FIG. 3 shows a simplified flow diagram of the ITU T.30-compliant message sequence timing of the invention.

Analog facsimile transmission time reduction via a CDMA cellular system is more fully appreciated upon inspection of FIG. 3, which depicts the timing improvement realized by using a CDMA system-generated PMI message.

With respect to FIG. 3, which depicts the message timing of a single, exemplary fax call via a CDMA system using a system-generated PMI, at time $T_0$ the RX side of the CDMA system detects the receiving fax machine's transmission of a preamble 301 that precedes the CSI and DIS messages 304. When the preamble 301 is detected, (which is preferably achieved by the CDMA infrastructure equipment by recognizing only a few bytes of a preamble message using pattern recognition) the CDMA system at the RX end (at line 208) immediately sends a PMI 302 (preamble message indicator, which is a message that is shorter in time (or possibly byte count or length) than a T.30 preamble) to the TX side of the CDMA system via a high-speed data link (not shown) precluding the necessity of having the TX side equipment wait until the preamble 301 and the following CSI and DIS messages 304 are completely received at the RX end (at line 208).

Having received only the PMI 302, CDMA network TX equipment recreates the multi-byte T.30 preamble 305, which under the ITU standard, precedes the CSI and DIS messages 306 sent from the TX end (at line 206) to the mobile fax (at line 202) so that as these messages are received at the TX side 206, the CSI and DIS messages 306 can be forwarded soon after to the mobile fax terminal, i.e. the sending fax machine 102. In the example shown in FIG. 3, approximately 2.1 seconds of time can be realized over the example shown in FIG. 2 by sending the PMI via high speed link.

After the sending fax 102 receives the CSI and DIS messages 306, the sending fax 102 will respond with a preamble 309 and its TSI and DCS messages 310. When the TX side of the CDMA network first detects the preamble 309 from the sending fax machine 102, the TX side of the CDMA system generates a PMI message 308 that is sent to the RX side (at line 208) of the CDMA system via a high-speed data link RF connection between the RX and TX ends 206 and 208.

As described above, when the RX side of the CDMA system receives the PMI 308 from the TX side of the CDMA system, the RX equipment of the CDMA system re-creates a multi-byte T.30 preamble 311 which is followed by the TSI and DCS messages 310 that were generated by the sending fax machine 102 in response to the receiving fax machines CSI and DIS messages 306. As shown in FIG. 3, the TSI and DCS messages 310 are received at the RX side of the CDMA system and sent to the receiving fax machine 4.6 seconds after the receiving fax machine 110 first starting sending a preamble 301, whereas the prior art system required substantially a minimum of 7.4 seconds.

After the receiving fax machine receives the TSI and DCS messages 310, followed by TCF 312, the receiving fax machine 110 generates a preamble 314 followed by a CFR message 316. When the RX equipment (at line 208) of the CDMA system detects the preamble 314 ahead of the CFR message 316, another PMI 318 is generated by the RX equipment (at line 208) that is forwarded to the TX side. 1.3 seconds after the RX side of the CDMA system sends the PMI 318, the receiving fax machine's CFR message 316 is sent to the TX side of the CDMA system. Inasmuch as the TX side already received the PMI 318, the TX side re-creates a T.30 message preamble 320, which is followed by the CFR message 316 sent from the TX side (at line 206). Upon receipt of the CFR message 316 from the TX side, the sending fax machine 102 begins sending image data 322, approximately 9.5 seconds after the receiving fax machine 110 first started sending its first preamble 301 at time $T_0$. By preemptively sending preamble message indicators 302, 308, 318, 330 instead of actual preambles, and by sending the PMI over a high-speed link, a significant amount of time can be saved in an analog facsimile call. The prior art methodology required as much as 18.5 seconds to begin sending image data, which in the example shown, takes 58 seconds.

Upon the conclusion of the image data transmission 324, the sending fax machine 102 will send an EOP message 326, which is also preceded by a preamble 328. Instead of the preamble 328, the TX CDMA equipment (at line 206) sends a PMI 330. When this PMI 330 is received at the RX side of the CDMA system (at line 208), the CDMA system re-creates the multi-byte T.30 message preamble 332 to be sent to the receiving fax machine ahead of the EOP 326. As shown in FIG. 3, the EOP 326 is sent to the receiving fax machine 110 approximately 70.9 seconds after $T_0$.

As before, upon receipt of the EOP 326, the receiving fax 110 issues an MCF message 334 preceded by a preamble 336. Using the same methodology, a PMI 338 sent in place of an actual T.30 preamble allows the CDMA system to recreate a preamble 340 at the TX side followed immediately by the MCF message 334.

At least one alternate embodiment of the invention will include error handling. In the case wherein a T.30 message preamble is received at a CDMA terminal, but the subsequent control messages are missing or corrupted, the CDMA terminal can optionally terminate the preamble message transmission thereby reducing time that would otherwise be wasted waiting for the preamble message to be fully received by the recipient fax machine. In yet another embodiment, the preamble message itself might be corrupted in which case a data terminal that detects a corrupted preamble can send an error message (PR-TERM __P message) to a subsequent data terminal upon detecting that the message preamble was corrupted, after which a remote terminal can cease to generate the message preamble signal and terminate the preamble+message sequence. In yet another embodiment, at the receiving fax end, after receiving a preamble message indicator, the T.30 preamble message is re-generated. If after some empirically-determined length of time a control message does not follow the PMI, the second CDMA terminal can terminate the re-generation of the T.30 preamble.

By using a high-speed PMI instead of sending the actual preamble messages the time required to send an analog fax across a CDMA network can be reduced to approximately 73 seconds where the prior art method required at least 83.6 seconds.

We claim:

1. A method of reducing facsimile transmission duration on a CDMA cellular communications network comprising:

detecting at a first CDMA cellular terminal coupled to a first analog fax machine, a first multi-byte message preamble that identifies the first element of a sequence in a facsimile control message transmission;

sending from said first CDMA cellular terminal to a second CDMA cellular terminal coupled to a second analog fax machine, a preamble message indicator, said preamble message indicator signaling to said second CDMA cellular network terminal the beginning of an analog facsimile control message transmission;

at the second CDMA cellular terminal, re-generating said first multibyte message preamble to said second analog fax machine upon the receipt of said preamble message indicator.

2. The method of claim 1 further comprising the steps of:

sending an analog facsimile control message from said first CDMA cellular terminal to said second CDMA cellular terminal after said reduced duration preamble indicator message is sent by said first CDMA cellular terminal;

at the second CDMA cellular terminal, sending said analog facsimile control message to said second analog fax machine.

3. The method of claim 1 wherein the step of detecting said message preamble at said first CDMA cellular terminal includes collecting a pattern of bytes for the duration of only a portion of said multi-byte message preamble.

4. The method of claim 3 wherein the number of bytes of said multi-byte message preamble that are detected is variable.

5. The method of claim 1 further including the step of: detecting at said first data terminal that data following said message preamble early detection interval is defective; and sending a first error message to said second data terminal upon detecting that said message preamble was corrupt, after which the remote terminal may cease to generate the message preamble signal and terminate the preamble+message sequence.

6. The method of claim 1 further including the step of: detecting at said first data terminal that the message following said message preamble is defective; and sending a first error message to said second data terminal upon detecting that said subsequent message was corrupt.

7. The method of claim 1 further including the step of: at the remote end, upon starting the preamble signal to the fax machine, detecting a communications error when the intended subsequent message was not received; and thereafter terminating said preamble message at the remote data terminal.

8. The method of claim 1 wherein said step of: detecting a first mult-byte message is comprised of the steps of:

receiving at a wireless CDMA terminal, an ITU-T.30 control message;

detecting, by said wireless CDMA terminal, a predetermined data sequence of a facsimile transmission message preamble ITU-T.30 format.

9. The method of claim 1 further including the step of: at the second CDMA network terminal, upon receipt of a preamble signal indicator, detecting a communications error when the intended subsequent message was not received; thereafter terminating the multi-byte message preamble re-generated at the second CDMA cellular network.

10. The method of claim 1 wherein said step of: detecting the beginning of a facsimile transmission message preamble is comprised of the steps of:

receiving at a wireless CDMA communications terminal, an ITU-T.30 control message;

detecting by said CDMA communications terminal, a predetermined data sequence of a facsimile transmission message preamble in said ITU-T.30 control message.

11. The method of claim 1 wherein said step of sending a reduced duration preamble indicator (PMI) message is comprised of the step of:

upon the detection of a beginning facsimile transmission message in said ITU-T.30 control message, sending to said distant second data terminal, a reduced duration preamble message indicator (PMI) indicating to said distant second data terminal the future receipt of a facsimile transmission message in said ITU-T.30 message sequence.

12. An apparatus for reducing facsimile transmission duration on a CDMA communications network comprising:

a first CDMA data terminal that detects a transmission message preamble identifying the beginning of an ITU T.30-compliant facsimile transmission message from a first analog fax machine, and which thereafter sends to a distant second CDMA data terminal, a reduced duration preamble indicator (PMI) message that signals to a second data terminal the beginning of a T.30 facsimile transmission;

a second CDMA data terminal that is capable of detecting said reduced duration preamble indicator message and in response thereto, initiating a T.30 preamble transmission to a second analog fax machine.

* * * * *